Patented Apr. 22, 1952

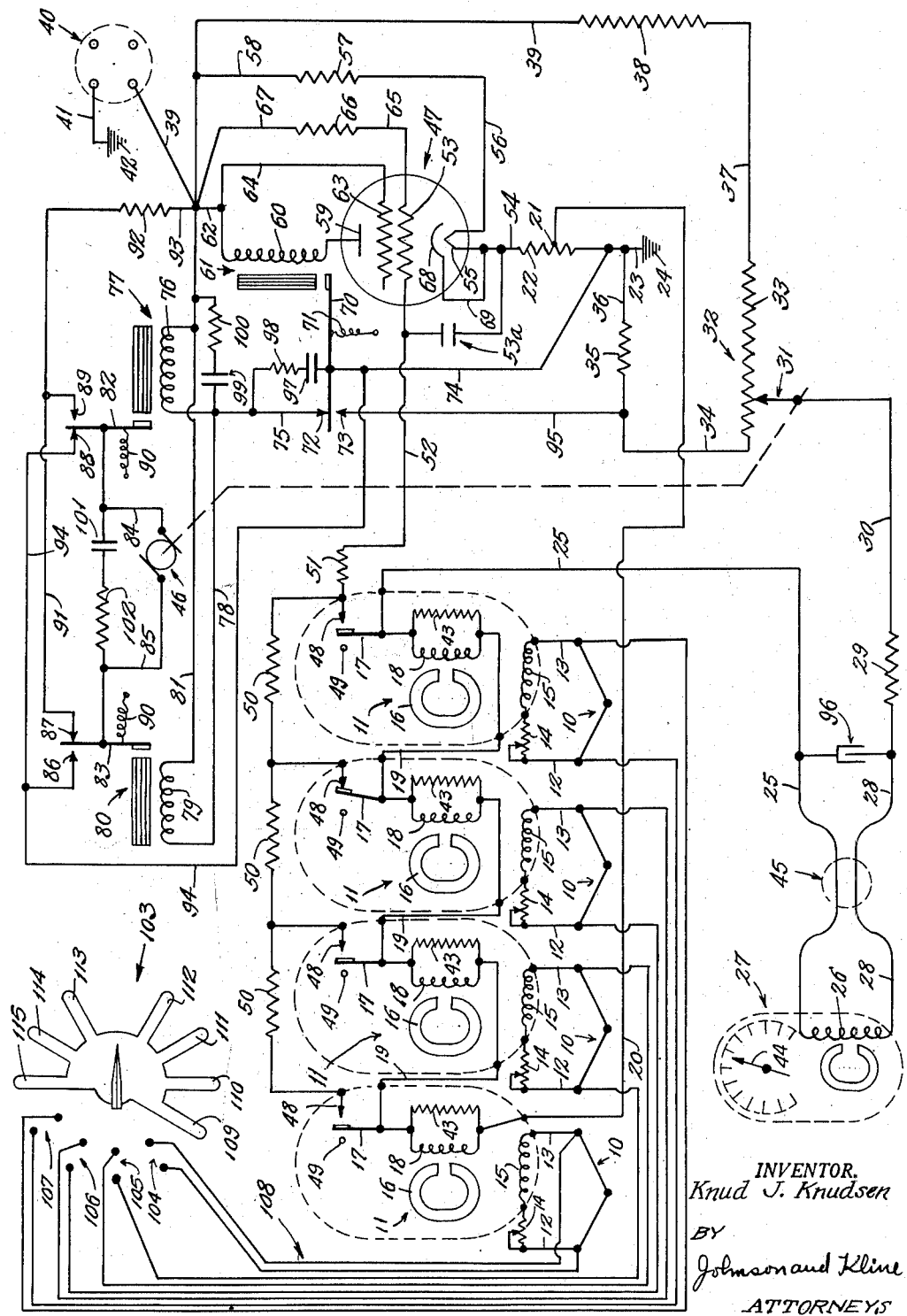

2,593,898

UNITED STATES PATENT OFFICE 2,593,898

MEANS FOR RESPONDING TO AN EXTREME OF A PLURALITY OF CONDITIONS

Knud J. Knudsen, Naugatuck, Conn., assignor to The Lewis Engineering Company, Naugatuck, Conn., a corporation of Connecticut Application June 17, 1948, Serial No. 33,650

16 Claims. (Cl. 73—341)

This invention relates to means for causing an actuatable device to respond to the operation of a plurality of condition-sensing means.

The present invention involves improvements in the apparatus described and claimed in my copending application Serial No. 734,748 filed March 14, 1947, entitled "Method and Means for Responding to a Plurality of Conditions." In this copending application the method and apparatus were shown as applied to the indicating and evaluating of the maximum of a plurality of temperatures of bearings in a machine, and the present invention is shown herein as applied to such use also.

An object of the invention is to provide an improved apparatus for providing a response in accordance with the value of the extreme one of a plurality of variables such as temperatures, etc., which apparatus is considerably simplified while at the same time effective and reliable, the apparatus having fewer parts and being of less costly construction.

Another object of the invention is to provide an improved apparatus as outlined immediately above, which is also adapted to indicate and to evaluate at any time the extreme variable, such indication and evaluation being provided either close to the variable or remote therefrom.

A still further object of the invention is to provide improved apparatus characterized as above, which may be arranged to occupy a smaller space, and to have less weight.

A feature of the invention resides in the provision of simplified and more economical apparatus as above, having electrical means which are adapted to provide an accurate and reliable response at a location remote from the variables, independent of the lead resistance of said means.

In the device of my copending application above referred to, a plurality of pairs of electrical instrument movements was provided, having deflectable members or pointers, one instrument movement of each pair being energized by a thermocouple or resistance thermometer bridge circuit and all the other instruments of the pairs being energized from a common source in a manner that said other instruments all had fixedly-related deflections. The pointers of the instruments in each pair moved in substantially coextensive paths and were mutually engageable when juxtaposed, thereby to function as an electrical switching or control means. These control means triggered a sensitive vacuum-tube relay device which in turn controlled the energization of the said other instruments of the pairs to make the energization fluctuating, and of such strength that continual engagement and disengagement was effected between the pair of pointers of the instruments associated with the extreme variable at all times, this condition being termed "hunting." The vacuum-tube relay operated a reversible electric motor and through the latter a potentiometer which controlled the potentials applied to the coils of the said other instrument movements. Thus the fluctuating energizations of all these coils and the positions of the pointers operated by them were at all times indicative of the position of the pointer (of the instrument movement energized by the extreme variable) which was being continually engaged and disengaged and which indicated the value of the extreme variable. Therefore a device responsive to said energization or such pointer positions could be employed to indicate at any time the said value.

In accordance with the present invention a single instrument movement is substituted for each of the pairs of movements of my prior apparatus. This single instrument movement includes a deflecting coil and an opposing coil, the one being energized by a thermocouple or resistance thermometer bridge, and the other being energized simultaneously with the corresponding opposing coils of the other instrument movements, from a potentiometer device under the control of the vacuum-tube relay. The deflectable members or pointers of the opposed-coil instrument movements are cooperable with stationary contacts so as to function as electrical switches which are connected to control the operation of the vacuum-tube relay. By virtue of the opposed coil construction, for any given set of fixedly-related energizations of the opposing coils of the instrument movements, the most deflected movement will be that associated with the extreme variable if the variable is the greatest in value. The opposing-coil energizations may therefore be regulated by the vacuum-tube relay to cause continual engagement and disengagement between the contacts of the instrument movement associated with the extreme variable, by continually causing a fluctuation in such energization in response to engagement and disengagement of the contacts. As a result of this, the average value of the said fluctuating energization will be indicative of the value of the extreme variable, and a control or indicating means may be employed, responsive to said average value, to indicate the value of the extreme variable, or to operate another device, etc.

The opposed-coil instrument movements and organization provided by the present invention enables a simple circuit and vacuum-tube relay to be provided to control the potentiometer or potential-varying means, and such simplification plus the elimination of one instrument movement from each pair as was heretofore provided in my copending application above referred to, results in a desirable economy of manufacture, and a simplification and reduction in the number of parts, and enables the device to be lighter in weight, more compact and smaller in size. In addition, as a consequence of the fewer number of movable parts a greater reliability may be expected from the device of the present invention.

A further object of the invention is to provide an improved and simplified apparatus as characterized above, in which the condition of any one of the plurality of variables may be indicated to an operator merely by a simple actuation of a manually operable selecting control.

A feature of the simplified apparatus of this invention is that the period of hunting or sensing is relatively small, as is the fluctuation in the energization of the instrument opposing coils; thus a simple type of accurate D. C. meter may be actuated by said energization to indicate the average value thereof.

While in the embodiment of the invention illustrated herein the variables are temperatures, as for example of bearings or other machine parts subject to heat, it should be understood that the invention is not to be limited to response to these specific variables, since it has utility in connection with other variables such as magnetism, light etc., and may also be made to respond to the minimum of such variables.

In the accompanying drawing, the single figure is a schematic or diagrammatic representation of an apparatus embodying the invention, for use in indicating and evaluating the maximum one of four temperatures.

As shown, this apparatus comprises a plurality of thermocouples 10 for providing electrical potentials in response to heat, the thermocouples being located at bearings or other parts of a machine (not shown), which may be subject to heating and which must be checked for temperature.

In accordance with the invention, single opposed-coil sensitive instrument movements 11 are provided in conjunction with the thermocouples 10 respectively, to provide a control for a vacuum-tube relay device hereinafter described whereby an energization is provided for the instrument movements having a relation to the temperature of the hottest of the thermocouples 10. This organization is thus seen to distinguish from the apparatus of my copending application above referred to, wherein pairs of sensitive instrument movements are associated with the thermocouples.

The thermocouples 10 in the present apparatus are connected by lead wires 12 and 13 respectively to resistors 14 and deflecting coils 15 of the sensitive instrument movements 11, which latter are shown as being of the D. C. type having the usual permanent magnets 16. Each resistor 14 and its associated deflecting coil 15 is series-connected so as to be series energized by the associated thermocouple 10. By this organization the electrical energization of the coils 15 is commensurate with the temperatures of the thermocouples 10, and any changes in such temperatures will result in corresponding changes in the coil energizations. The deflecting coils 15 constitute parts of the movable systems of the movements 11, which systems also include deflectable members or pointers 17. Presuming uniform yielding opposition to deflection of the movable systems, the deflected positions of the pointers 17 thereof may be indicative of the energization of the coils 15 and therefore of the temperatures of the thermocouples 10. Normally, in instrument movements such yielding opposition is provided by spiral springs associated with the movable systems. However, according to the present organization, the opposition for the movable systems of the instruments 11 is not uniform, but is variable, and is provided by opposing coils 18 wound on the same spools as the deflecting coils 15 whereby the deflected positions of the pointers 17 may not at any time be indicative of the temperatures of the associated thermocouples. This again distinguishes from the apparatus of my copending application referred to, and wherein the deflected positions of the pointers are all indicative of temperatures.

Considering the components and circuit only so far as already described, if all of the coils 18 are continually energized to the same extent and such energization is properly adjusted, and if the thermocouples 10 have different temperatures one of which is greater than all the rest, then that one of the deflectable members 17 associated with the thermocouple of highest temperature may be made to manifest the greatest deflection. Such equal energization of the opposing coils 18 at all times, is effected in the present apparatus by connecting the coils in series with each other by means of wires 19, and by connecting the two remaining ends of the coils to a source of current. One remaining end of the series-connected coils 18 is connected by a wire 20 to an intermediate point 21 on a resistor 22 having one end connected by a wire 23 with a ground 24. The other remaining end of the coils is connected by a wire 25 to the deflecting coil 26 of an indicating instrument movement 27 the purpose of which will be later described, the coil 26 being connected by a wire 28 to a resistor 29 in turn connected by a wire 30 to the slider 31 of a potentiometer 32.

The potentiometer 32 has a resistance element 33 one end of which is connected by a wire 34 with a fixed resistor 35 in turn connected by a wire 36 with the ground wire 23 of the system. The other end of the potentiometer resistor 33 is connected by a wire 37 with the resistor 38 in turn connected by a wire 39 to one terminal of a current supply plug or fitting 40 another terminal of which is connected by a wire 41 to a second ground 42. The fitting 40 is adapted to receive current from a source of supply which may have a potential of approximately 24 volts D. C. The grounds 24 and 42 are negative, and the supply wire 39 from the plug 40 is positive.

It will be seen that a current will continually flow through the wire 39, resistor 38, wire 37, potentiometer resistor 33, wire 34, resistor 35 and ground wire 23, and through the grounds 24 and 42 to the ground wire 41. This will cause a potential to be set up between the wires 20 and 30, having a value determined by the drop across the resistors 35 and 33, and by the position of the potentiometer slider 31 on the resistor 33. Such potential between the wires 20 and 30 will cause an energizing current to flow through the resistor 29, instrument coil 26 and through all the series-connected opposing coils 18 of the instruments 11. The coils 18 and 26 will therefore be energized with fixedly-related currents the values of which may be determined by the values of resistors 43 bridged across the opposing coils 18 respectively.

The instrument movement 27, which is actually a device actuatable in varying degrees as specified in the appended claims, I here term for convenience and brevity a master instrument, and this instrument may have an indicating pointer 44 responsive to the energization of the coil 26 whereby the deflection of the pointer 44 will be indicative of the energization of the opposing coils 18 of the instruments 11. The master instrument 27 may be located at a point remote from the instruments 11 and thermocouples 10, and to indicate this a connector fitting 45 is shown in the wires 25 and 28, whereby the wire leads between the fitting 45 and the coil 26 may have considerable length and may constitute the leads of the master instrument 27, the fitting 45 being located adjacent the instruments 11 and thermocouples 10.

According to the present invention, the energization of the opposing coils 18 of the instrument movements 11 is automatically controlled and regulated by the deflectable members 17 of the movements so as to have a continually fluctuating character, and to have an average value which is related at all times to the current existing in the most-energized one of the deflecting coils 15, and therefore related to the temperature of the hottest one of the thermocouples 10. In effecting this control, the slider 31 of the potentiometer 32 is coupled to a reversible motor 46 to be reversibly actuated thereby, the said motor being in turn controlled by a relay device including a vacuum tube 47 which latter is in turn controlled by the deflectable members 17 of the instrument movements 11. To effect control of the vacuum tube 47, the deflectable members 17 are constituted as electrical contacts, and each instrument movement 11 has a stationary contact 48 which is engageable by the associated deflectable member 17 when the latter attains a predetermined maximum deflected position adjacent the stationary contact. Stops 49 are also provided on the instrument movements 11, and are engageable with the respective members 17 to limit the movement thereof in the direction of minimum deflection.

The switches represented by the deflectable member 17 and associated stationary contacts 48 are also hereinafter referred to as control means; obviously various different types of controls may be substituted for the control represented by the members 17 and stationary contacts 48. The stationary contacts 48 are interconnected by a plurality of resistors 50, which may advantageously have values of 20,000 ohms each, and which I term grid resistors since they are connected to the control grid of the vacuum tube 47. The stationary contact 48 of the right-most instrument 11 is connected with a grid resistor 51 which may be of 100,000 ohms resistance and which is in turn connected by a wire 52 with the control grid 53 of the vacuum tube 47. Each of the deflectable members 17 in addition to being mechanically connected with the coils 15 and 18 of the instrument movement is electrically connected to the wire 19 leading to the associated opposing coil of the movement, and by such connection there is provided a means for producing a negative bias on the control grid 53 of the vacuum tube 47 whenever any one of the deflectable members engages its cooperable stationary contact 48. Such bias is accomplished by virtue of the following connections: the resistor 22 is connected by a wire 54 to the heater 55 of the tube 47, the heater being also connected by a wire 56 to a current-limiting resistor 57 which is connected by a wire 58 with the positive supply wire 39. The vacuum tube 47 is of the screen-grid type, having an anode 59 connected to a coil 60 of a relay 61 whose function will later be described, the said coil being connected by a wire 62 to the positive supply line 39. The screen grid 63 of the vacuum tube is connected by a wire 64 to the wire 62, and the control grid 53 connected by a wire 65 to a grid resistor 66 which may be of 40 megohms resistance and which is in turn connected by a wire 67 with the positive supply line 39. The cathode 68 of the tube 47 is connected by a wire 69 to the supply wire 54 for the heater 55.

A grid condenser 53a is connected between the control grid 53 and the heater lead wire 54 as shown.

By virtue of these connections the heater 55 of the tube 47 may be energized from the same source of supply which energizes the instrument coils 18 and 26 through the resistors 33 and 35. The anode 59 of the tube will be positively charged, as will be the screen grid 63, and the control grid 53 will have a positive charge which renders the tube conducting whenever all of the deflecting members 17 are separated from the associated stationary contacts 48. This positive charge on the control grid 53 will be effected by virtue of its connection through the resistor 66 to the positive supply line 39. Whenever any of the deflectable members 17 engages its cooperable stationary contact 48 the effect of the positive charge which was established through the high resistance 66 will be overcome by virtue of connection of the control grid 53 through the lower-valued resistors 50 and 51 to the lead wire 20 which is virtually the negative side of the current supply, inasmuch as the value of the current-limiting resistor 22 is relatively small, on the order of 40 ohms. Such negative bias will immediately render the tube 47 non-conducting. Therefore it will be seen that whenever all of the deflecting members 17 are separated from the stationary contacts 48 the tube 47 will be conducting, and whenever any one or more of the members 17 engages the associated contact 48 the negative bias provided on the control grid 53 will cause the tube 47 to be immediately rendered non-conducting. The grid resistors 50 are provided between the stationary contacts 48 to prevent a short circuit from occuring across any one of the coils 18 if two contacts 17 should simultaneously engage their cooperable contacts 48, which short circuit would cause erratic readings on the instrument 27.

The reversible motor 46 is made to travel in one direction or the other in accordance with the conducting and non-conducting conditions of the tube 47. In accomplishing this the relay 61 is utilized, the coil 60 of which is in the plate or anode circuit of the vacuum tube. The relay 61 has an armature 70 biased by a coil spring 71 as shown and engageable with stationary contacts 72 and 73, the spring 71 normally maintaining the armature in engagement with the contact 72 when the relay coil 60 is deenergized, corresponding to the non-conducting condition of the vacuum tube 47. The relay armature 70 is connected by a wire 74 with the ground lead 23 of the system, and the stationary contact 72 is connected by a wire 75 to the coil 76 of a motor control relay 77, a wire 78 connecting the wire 75 to the coil 79 of a second motor control relay 80. The other ends of the relay coils 76 and 79 are connected together by a wire 81 which also connects to the positive supply line 39. It will be seen that deenergization of the relay coil 60 will result in the relay coils 76 and 79 being energized and that energization of the relay coil 60 will cause the coils 76 and 79 to be deenergized. The motor control relays 77 and 80 have armatures 82 and 83 respectively connected by wires 84 and 85 with the reversible motor 46, which may be of the type having a permanent magnet field. The relay armatures 82 and 83 are engageable with pairs of stationary contacts 86, 87 and 88, 89, the armatures engaging the contacts 87 and 89 when the relays are energized, and engaging the contacts 86 and 88 when the relays are deenergized, the latter engagement being effected by springs 90 which bias the relay armatures. The stationary contacts 87 and 89 are connected together by a wire 91 which connects them with a current-limiting resistor 92 in turn connected by a wire 93 with the positive supply line 39. The stationary contacts 86 and 88 are connected together by a wire 94 which also connects to the wire 74 joining the negative supply wire 23 of the system.

Energization of the relay coil 60 thus deenergizes the motor control relays 77 and 80 and results in the motor 46 being operated in one direction, and deenergization of the relay coil 60 results in energization of the relays 77 and 80, causing the motor 46 to operate in the reverse direction. The motor 46 therefore actuates the slider 31 of the potentiometer 32 in one direction or the other in accordance with the conducting and non-conducting conditions of the vacuum tube 47, which is in turn controlled by engagement or disengagement of a deflectable member 17 with a cooperable stationary contact 48. Upon proper adjustment of the various values, the circuit of this organization will result in an automatic oscillation or hunting condition being produced, whereby the most-deflected one of the members 17 is continually engaging and disengaging its associated stationary contact 48, the vacuum tube 47 alternately being conducting and non-conducting and the relays 61, 77 and 80 alternately operating and not operating and causing the motor 46 to continually be reversed, producing reversing movements of the potentiometer slider 31.

For the purpose of reducing the period of such hunting, that is, reducing the extent of travel of the motor 46 and potentiometer slider 31, the resistor 35 has been provided, and is connected by a wire 95 to the stationary contact 73 of the relay 61 so as to be short-circuited by the relay armature whenever the relay is energized. I term the resistor 35 an anticipator resistor since its action is to anticipate the movement of the potentiometer slider 31 and to provide the effect of the slider having moved a greater distance than it actually does. This results in a lesser travel being required of the slider 31 and the motor 36, and reduces the period or increases the frequency of hunting of the system. It will be understood that such hunting provides a fluctuating energization in the instrument coils 26 and 18, the fluctuations being correspondingly decreased by the action of the anticipator resistor 35 in the manner just described.

The operation of the improved device of the present invention may now be readily understood. Assuming that the thermocouples 10 are heated to degrees which are not all equal to each other, that thermocouple which has the highest temperature will tend to cause the greatest deflection to be manifested by the member 17 of its associated instrument movement 11. Providing that this most-deflected member is not engaging its cooperable stationary contact 48, the vacuum tube 47 will be conducting and the anode circuit relay 61 will be energized resulting in deenergization of the motor control relays 77 and 80 and causing the motor 46 to operate in a direction such that the potentiometer slider 31 is shifted to the left, as viewed in the figure, decreasing the potential applied to the instrument coils 26 and 18. This will cause a corresponding simultaneous increase in all of the deflections of the members 17, and such increase will continue until the most-deflected member engages its cooperable stationary contact 48, whereupon immediately the tube 47 will be rendered non-conducting, the relay 61 deenergized and the relays 77 and 80 energized, causing the motor 46 to reverse and to drive the potentiometer slider 31 to the right. Also, the relay armature 70 will remove its short-circuit from the anticipator resistor 35, and this will occur before any great amount of travel of the potentiometer slider 31 has taken place, and will have the same effect as travel of the slider to the right, only magnified considerably. The net result will be an increase in the energization of the instrument coils 18 to such extent that the most-deflected one of the members 17 is separated from its stationary contact 48. Such separation will now render the tube 47 conducting, will acutate the relays 61, 77 and 80 to reverse the motor 46 and drive the potentiometer slider 31 to the left and will also short-circuit the anticipator resistor 35. This will again cause a decrease in the energization of the opposing coils 18 and result in the most deflected member 17 again engaging its cooperable contact 48. A condition of hunting or oscillation will therefore be had continually, and the average value of the energization of the coils 18 as effected by the resistor 35 and potentiometer 32 will be related to and commensurate with the energization of the deflecting coil 15 associated with the most-deflected member, and therefore related to and commensurate with the temperature of the associated thermocouple 10. Such energization may thus be taken as a measure of the temperature of the thermocouple, and will be indicated by the pointer 44 of the master instrument 27.

To by-pass the fluctuation in the current, due to the anticipator action, around the coil 26 of the master instrument 27, a condenser 96 is connected between the wires 25 and 28, thereby to eliminate oscillation of the pointer 44. Also to minimize sparking at the relay 61 a series-connected condenser 97 and resistor 98 are bridged from the wire 75 to the relay armature 70. A series-connected condenser 99 and resistor 100 are also connected between the wires 81 and 75, and a series-connected condenser 101 and resistor 102 are connected between the wires 84 and 85 to minimize sparking at contacts 86, 87, 88 and 89.

In accordance with the present invention, novel manually operable means are provided to enable an operator to conveniently obtain a reading of the temperature of any one of the thermocouples 10. This means renders inoperative any three of the thermocouples 10 so that the remaining thermocouple may alone be effective, and so that the lone associated member 17 will constitute the only operable control for the vacuum tube relay device, thereby resulting in an energizing current through the instrument coils 18 which is commensurate with the temperature of the thermocouple 10 remaining effective. The means comprises a rotary selector switch 103 having four pairs of contacts 104, 105, 106, and 107 connected through an eight-wire cable 108 respectively to the pairs of terminals of the thermocouples 10. The selector switch 103 has blades 109, 110, 111, 112, 113, 114 and 115 grouped in one set of three and a second set of four, with a space between the sets, the blades being adapted to bridge the pairs of contacts 104 through 107. By this organization any three of the pairs of contacts 104 through 107 may be short-circuited while the remaining pair is open-circuited, resulting in any three of the thermocouple circuits being short-circuited and the remaining circuit being open circuited. It will be seen that the switch 103 may be placed in any one of four positions, to select any one of the four thermocouples 10 and instrument movements 11 to be that which is solely operative, and therefore an operator may readily check the individual temperatures of the thermocouples 10, which will be registered on the master instrument 27.

The apparatus of the present invention may be adapted for use with temperatures or variables which have normal values at considerable variance with each other, to indicate the temperature representing the greatest departure from a normal value. To accomplish this, when the thermocouples 10 are at their normal predetermined temperatures the resistors 14 are varied to cause the deflecting currents in the coils 15 to be substantially equal to each other, and thereby to cause the deflections of the members 17 to be substantially equal. With such adjustment, the temperature of the variable most at variance with its normal value will cause the associated member 17 to have the greatest deflection, and therefore the system will respond so as to indicate the value of such temperature even though this value is below another temperature which has not departed from its normal to the same extent.

If the leads of the opposing coils 18 should be reversed, and the leads of the deflecting coils 17 reversed, the apparatus will be in condition to respond to the least hot thermocouple 10 instead of to the hottest thermocouple, and therefore it will be seen that either the greatest or least extreme condition may be indicated by the present apparatus.

Variations and modifications may be made within the scope of this invention and portions of the improvements may be used without others.

I claim:

1. In an instrument for responding continually in accordance with the value of whichever of a plurality of independent variables is the extreme thereof, a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being operated only whenever the coils of the movement are energized in a predetermined ratio; and energizing means controlled by said control means, and including a source of energy, for automatically simultaneously energizing the opposing coils with fixedly-related amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the variable.

2. An instrument for responding continually in accordance with the value of whichever of a plurality of independent variables is the extreme thereof, comprising a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being operated only whenever the coils of the movement are energized in a predetermined ratio; energizing means controlled by said control means, and including a source of energy, for automatically simultaneously energizing the opposing coils with fluctuating, fixedly-related amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the variable; and means providing a response in accordance with the energization of the opposing coils.

3. In an instrument for responding continually in accordance with the value of whichever of a plurality of independent variables is the extreme thereof, a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being operated only whenever the coils of the movement are energized in a predetermined ratio; energizing means controlled by said control means, and including a source of energy, for automatically simultaneously energizing the opposing coils with fluctuating fixedly-related amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the variable; and means including a mechanism located at a point remote from the instrument movements, providing a response at said remote point in accordance with the energization of the opposing coils.

4. In an instrument for responding continually in accordance with the value of whichever one of a plurality of independent variables is the extreme thereof, a plurality of separate means for translating said variables respectively into variable electric potentials; a plurality of electric instrument movements, each having a deflecting coil and an opposing coil; circuit means, the deflecting coils respectively with said potentials; a separate control means operable by each instrument movement, each control means being operated only whenever the coils of the movement are energized in a predetermined ratio; energizing means controlled by said control means, and including a source of energy, for automatically simultaneously energizing the opposing coils with fluctuating, fixedly-related amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the value of the variable; and an additional electric instrument movement located remote from the other instrument movements and series-connected with the opposing coils thereof to indicate the energization of the said coils, and thereby provide an indication of the extreme variable.

5. In an instrument for responding continually in accordance with whichever of a plurality of variables represents the maximum of all departures from normal values of said variables, a plurality separate of means for translating said variables respectively into variable electric potentials; a plurality of electric instrument movements, each having a deflecting coil and an opposing coil; circuit means, energizing the deflecting coils respectively with said potentials, including adjustable means providing for said instrument movements having equal reactions when the variables are at their individual normal values; a separate control means operated by each instrument, each control means being operated only whenever the coils of the movement are energized in a predetermined ratio; and energizing means controlled by said control means and including a source of energy, for automatically simultaneously energizing the opposing coils with fluctuating equal amounts of current to cause operation of that one of the control means operated by the instrument movement associated with the variable most at variance with its normal value, said energizing means maintaining said operated control continually operative while the variable associated therewith is the one most at variance, and providing an energization which is related to the response of the translating means associated with said variable most at variance.

6. In an instrument for responding continually in accordance with the value of whichever of a plurality of independent variables is the extreme thereof, a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being operated only whenever the coils of the movement are energized in a predetermined ratio; a source of energy; means for varying the source of energy; means connecting together the source of energy and all the opposing coils, for simultaneously energizing the latter with fixedly-related amounts of current; and actuating means controlled by said control means, for actuating the energy-varying means to cause operation of that one of the control means which is operated by the instrument movement associated with the extreme variable, said actuating means automatically maintaining said operated control means continually operative while the variable associated therewith is an extreme and causing the opposing-coil energization to be fluctuating and related to the response of the translating means associated with the extreme variable.

7. An instrument for responding continually in accordance with the value of whichever of a plurality of independent variables is the extreme thereof, comprising a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being continually operated only whenever the coils of the movement are energized in a predetermined ratio, at least one of said energizations being fluctuating; a source of energy; means for varying the source of energy; means connecting together the source of energy and all the opposing coils, for automatically simultaneously energizing the latter with fixedly-related amounts of current; actuating means controlled by said control means, for actuating the energy-varying means to cause operation of that one of the control means which is operated by the instrument movement associated with the extreme variable, said actuating means maintaining said operated control means continually operative while the variable associated therewith is an extreme and causing the opposing-coil energization to be fluctuating and related to the response of the translating means associated with the extreme variable; and means providing a response in accordance with the energization of the opposing coils.

8. An instrument for responding continually in accordance with the value of whichever of a plurality of independent variables is the extreme thereof, comprising a plurality of separate means for translating said variables respectively into variable electric potentials; a plurality of electric instrument movements each having a deflecting coil and an opposing coil; circuit means, energizing the deflecting coils respectively with said potentials; a switch operable by each instrument movement, each switch being continually opened and closed only whenever the coils of the movement are energized in a predetermined ratio, at least one of said energizations being fluctuating; a source of energy; means for varying the source of energy; means connecting together the source of energy and all the opposing coils, for automatically simultaneously energizing the latter with fixedly-related amounts of current; actuating means controlled by said switches for actuating the energy-varying means to cause operation of that one of the switches which is operated by the instrument movement associated with the extreme variable, said actuating means maintaining said switch continually opening and closing while the variable associated therewith is an extreme and causing the opposing-coil energization to be fluctuating and related to the response of the translating means associated with the extreme variable; and means providing a response in accordance with the energization of the opposing coils.

9. This invention as defined in claim 8, in which the switches comprise movable contacts actuated by the deflecting and opposing coils, and comprise stationary contacts associated with the instrument movements and respectively cooperable with said movable contacts, and in which the actuating means includes a vacuum tube relay the control grid circuit of which is connected with the said switches.

10. The invention as defined in claim 8, in which the actuating means includes a vacuum tube relay having a control grid circuit, and includes grid resistors connected in said circuit and interconnecting the said switches.

11. The invention as defined in claim 8 in which the actuating means includes a vacuum tube relay having a control grid circuit, and includes grid resistors connected in said circuit, all but one of said resistors interconnecting the said switches.

12. In an instrument for responding continually in accordance with the value of whichever of a plurality of independent variables of one kind is the extreme thereof, a plurality of separate means for translating said variables respectively into variable electric potentials which are proportional to the variables and substantially equal to each other when the variables all have the same value; a plurality of electric instrument movements, each having a deflecting coil and an opposing coil; circuit means, energizing the deflecting coils respectively with said potentials; a plurality of separate control means operable respectively by the instrument movements, each control means being operated only whenever the coils of the associated movement are energized in a predetermined ratio which is substantially the same for each movement; and energizing means controlled by said control means, and including a source of energy, for automatically simultaneously energizing the opposing coils with equal amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the variable.

13. In an instrument for responding continually in accordance with the value of whichever of a plurality of independent variables is the extreme thereof, a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being continually operated only whenever the coils of the movement are energized in a predetermined ratio, at least one of said energizations being fluctuating; and energizing means controlled by said control means, and including a source of energy, for automatically simultaneously energizing the opposing coils with fluctuating fixedly-related amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the variable.

14. In an instrument for responding continually in accordance with the value of whichever of a plurality of independent variables is the extreme thereof, a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being operated only whenever the coils of the movement are energized in a predetermined ratio; energizing means controlled by said control means, and including a source of energy, for automatically simultaneously energizing the opposing coils with fluctuating fixedly-related amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the variable; and manually operable selecting switch means connected with said circuit means for rendering inoperative all but any selected one of said circuit means, thereby causing only one translating means and the variable associated therewith to control the energization of the opposing coils whereby such energization is related to the said one variable.

15. In an instrument for responding continually in accordance with the value of whichever of a plurality of independent variables is the extreme thereof, a plurality of separate means for translating said variables respectively into variable electric potentials; a plurality of electric instrument movements, each having a deflecting coil and an opposing coil; circuit means, energizing the deflecting coils respectively with said potentials; a separate control means operable by each instrument movement, each control means being operated only whenever the coils of the movement are energized in a predetermined ratio; energizing means controlled by said control means, and including a source of energy, for automatically simultaneously energizing the opposing coils with fluctuating fixedly-related amounts of current to cause operation of that one of the control means which is operated by the instrument movement associated with the extreme variable, said energizing means maintaining said operated control means continually operative while the variable associated therewith is an extreme and providing an energization which is related to the response of the translating means associated with the extreme variable, and thereby to the variable; and means including a manually operable selector switch, for short-circuiting all but any selected one of said deflecting coils and causing the instrument movement having the coil not short-circuited to continually operate its associated control means, thereby causing the energization of the opposing coils to be related to the translating means and variable associated with said instrument movement.

16. An instrument for responding continually in accordance with the value of whichever of a plurality of independent variables is the extreme thereof, comprising a plurality of separate means for translating said variables respectively into electric potentials; a plurality of electric instrument movements, each having mechanically connected deflecting and opposing coils; circuit means, energizing the deflecting coils respectively with said potentials; a switch operable by each instrument movement, each switch having a pair of mutually engageable stationary and movable contacts, the movable contact being electrically and mechanically connected to the opposing coil of the instrument movement therewith, and engaging the stationary contact when the coils are energized in a predetermined ratio; means including a source of direct current, providing a D. C. potential; reversibly-operable means for varying said potential; circuit means, simultaneously energizing the opposing coils from said potential with fixedly-related amounts of current; and actuating means controlled by said switches and including a vacuum tube relay the control-grid circuit of which is connected with said stationary switch contacts, for automatically reversibly actuating the potential-varying means to cause continued oscillation of the instrument movements and continued opening and closing of that switch which is operated by the movement associated with the extreme variable, said vacuum tube being energized by said source of direct current to have its control grid normally positive with respect to the potential of the opposing coils and the movable switch contacts when the switches are open, and said actuating means causing the opposing-coil energization to be fluctuating and have an average value related to the response of the translating means associated with the extreme variable; and means providing a response in accordance with the average value of energization of the opposing coils.

KNUD J. KNUDSEN.

REFERENCES CITED

The following references are of record in the file of this patent:

UNITED STATES PATENTS

| Number | Name | Date |
|---|---|---|
| 1,125,699 | Leeds | Jan. 19, 1915 |
| 2,285,716 | Hulsberg | June 9, 1942 |
| 2,455,654 | Browne | Dec. 7, 1948 |